Nov. 4, 1930.  W. B. RANNEY  1,780,601
MEASURING DEVICE
Filed Dec. 15, 1928
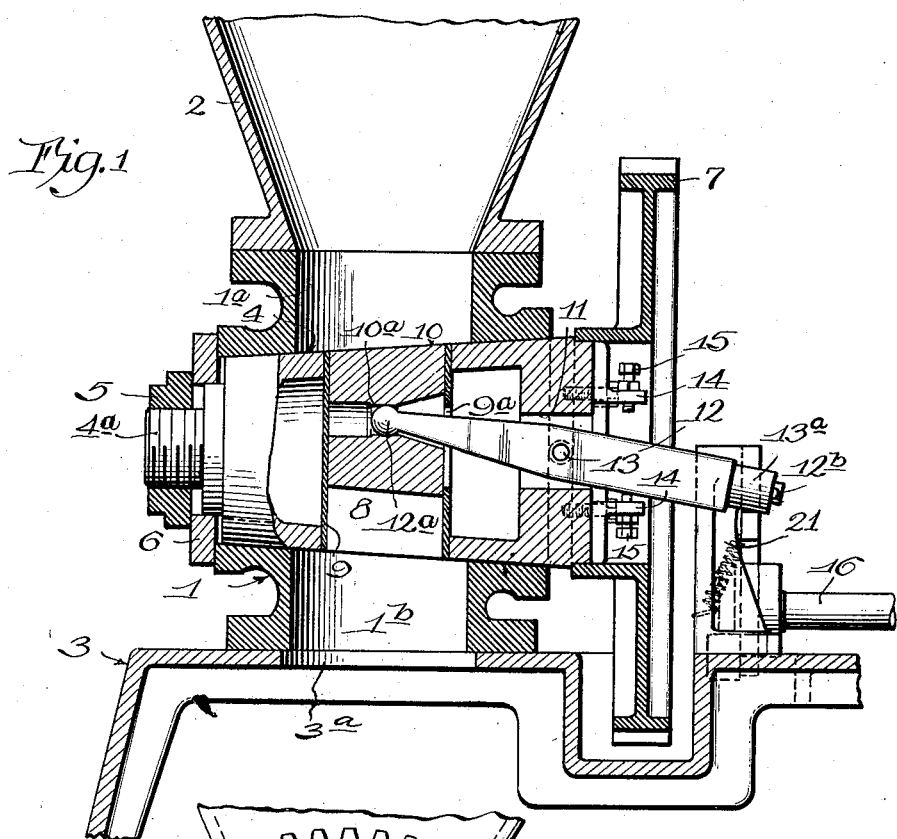
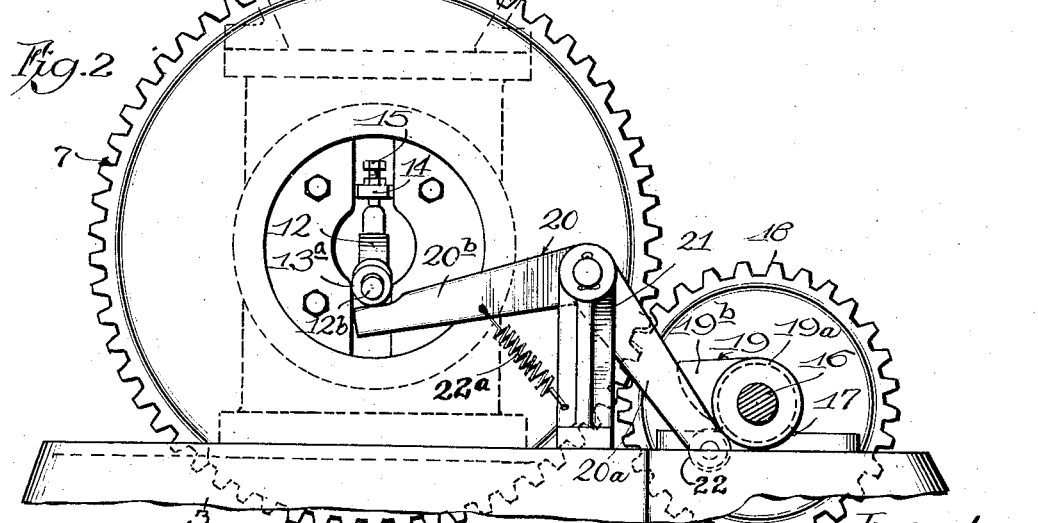

Patented Nov. 4, 1930

1,780,601

UNITED STATES PATENT OFFICE

WILLET B. RANNEY, OF CHICAGO, ILLINOIS, ASSIGNOR TO WM. WRIGLEY JR. COMPANY, OF CHICAGO, ILLINOIS, A CORPORATION OF DELAWARE

MEASURING DEVICE

Application filed December 15, 1928. Serial No. 326,279.

This invention relates to improvements in measuring devices, and more especially to devices for measuring and discharging predetermined quantities of material during given periods of time and adapted to be used in mixing operations where accuracy in the proportions of the materials being mixed is sought.

The object of the invention is to provide a practical and efficient apparatus for measuring fluid or plastic materials fed continuously thereto and discharged intermittently in uniform amounts by the coaction of rotative and reciprocating members interposed in the path of the material.

A further object of the invention is to provide a measuring device especially adapted to handle sticky or gummy substances, such as chicle in the manufacture of chewing gum, although it is also readily applicable for general industrial uses.

A preferred embodiment of the invention is disclosed in the accompanying drawings, in which Figure 1 is a view in vertical section taken axially of the rotative member of the device; and Figure 2 is a view in end elevation showing the driving mechanism of the device.

The measuring device is adapted to be located at any convenient point in the passage of the material to be measured from its source of supply to its use. In the present instance the measuring device is assumed to receive the material into a hopper from above, from whence it passes through the measuring device and is delivered in the form of charges into a mixer or other receiver below.

In general, the device consists of a cylindric metal casing 1, having an upper intake passage 1$^a$ and a lower discharge passage 1$^b$ located in vertical alignment with each other on opposite sides of a horizontal tapered chamber in which a rotative body 4 is mounted, the same being tapered to fit within its chamber. The casing supports a hopper 2 communicating with the intake passage 1$^a$, and is supported upon a frame or supporting structure 3 having a discharge opening 3$^a$ just below the discharge passage of the casing.

In general construction and appearance, the casing with its rotative body resembles the ordinary valve of the tapered plug type; in fact, it is quite possible to use a standard make of valve as the foundation of the device by reconstructing the plug or valve member. It may be assumed that this has been done in the present instance as a means for simplifying the process and reducing the cost of manufacture.

The rotative valve member is preferably of a hollow construction and held to its tapered seat in the casing by means of a nut 5 mounted on a threaded shank 4$^a$ at the smaller end of the body, the opening in the casing at the adjacent end of the casing being closed by a collar or washer 6 between the nut and the flange surrounding the opening 1$^a$.

The opposite and larger end of the body 4 projects a short distance from the casing, and rigidly mounted thereon is a large spur gear wheel 7 which is power driven to rotate the body at a uniform speed, as will be presently described.

Extending transversely and diametrically through the body 4 is a cylindric passage 8 formed by fitting a tubular lining 9 of brass or other metal into diametrically opposed openings in the walls of the hollow body. This passage forms a cylinder in which travels a piston 10 of approximately two-thirds the length of the cylinder, although in practice the length of the piston would be determined by the desired volume of space in the cylinder between the end of the cylinder and the end of the piston when the latter is at one end of its stroke. This volume represents the capacity of the device for each half revolution of the body, as will later be more clearly explained.

The piston is beveled and rounded at its ends to conform to the conformation of the chamber in which the body rotates, and is shifted in its cylinder through the medium of the following driving parts. Extending through a slot 11 in the base or larger end of the body 4 is a rocking lever 12 pivoted midway of its ends on a pin 13 extending crosswise of said slot with its axis intersecting the axis of rotation of the body 4. The lever has a tapered arm extending into the body and thence through a slot 9ª in the cylinder lining, and a tapered radial cavity in the piston terminating in a spherical end 12ª engaging socket bearing 10ª at the center of the piston. The lever extends outwardly from the slot 11 in the end of the body 4, terminating beyond the plane of the gear wheel 7 in a reduced end portion 12ᵇ on which is mounted a cam roller 13ª.

Bolted to the face of the body 4, and on opposite sides of the slot 11, is a pair of L-shaped brackets 14, 14 each having a screw 15 mounted in the axially projecting web thereof, said screws being arranged radially with respect to the axis of the body with their ends facing toward the lever 12 and in the plane of its rocking movement. These screws are adjustable endwise and act to define the arc through which the lever rocks, and likewise determine the stroke of the piston 10.

Referring now to the drive for both the body 4 and the lever 12, a drive shaft 16 is located on one side of the casing 1 (Figure 2) and extends parallel with the axis of the body 4. This drive shaft is connected with any suitable source of power and is journalled in bearings such as 17, which in turn are bolted to the supporting frame or structure 3. Keyed to the shaft 16 is a pinion 18 which meshes with the driven gear wheel 7, said pinion being one-half the diameter of the gear wheel, so that for every revolution of the drive shaft the gear wheel 7 and the body 4 of the device turn through one-half a revolution or 180°. Adjacent the pinion 18 and also keyed to the drive shaft 16, is a cam 19 consisting of a hub 19ª and a radial cam projection 19ᵇ having a curved edge and a straight edge tangential to the periphery of the hub and meeting in a point.

Mounted in the plane of the cam 19 is a bell crank lever 20 journalled on a bearing standard 21 bolted to the bearing support for the drive shaft and between the same and the casing 1. The shorter arm 20ª of the bell crank lever is inclined downwardly and laterally toward the cam and acts as the cam follower, having a roller 22 at its end which contacts with the cam. The longer arm 20ᵇ of the bell crank lever extends more nearly horizontal and terminates beneath and in contact with the roller 13ª at the outer end of the rocking lever 12, the upper edge of the arm 20ᵇ adjacent its end being tapered off slightly and beveled or rounded to allow for the rocking or rolling contact with the roller 13. A coil spring 22ª connects the arm 20ᵇ of the lever 20 with the bearing standard 21 and acts to hold the follower arm 20ª against the cam 19.

The operation of the measuring device will be understood from the following: Assuming that the material to be measured is fed into the hopper 2 and fills the intake passage 1ª, the amount which can pass into the cylinder 8 is limited to space above the upper end of the piston when it is at the bottom of its stroke. Hence, if the body 4 is turned to a position in which the cylinder is in line with the inlet and discharge openings, and the piston is at the upper end of its stroke, as shown in Figure 1, a downward movement of the piston will fill the space above the piston with a charge of the material, the volume of which has been determined. Now, if the body 4 is turned through one-half a revolution, the piston remaining stationary in the cylinder, the charge will be carried around to the discharge opening, and if thereupon the piston is driven downwardly, the charge will be forced from the cylinder as the piston descends, at the same time another charge is filling the space at the top of the cylinder.

This is the action of the device when in operation, although the movement of the body and piston are synchronized to bring about the discharge of the material at a uniform rate. The body 4 rotates in one direction at a uniform speed, being driven through the gear wheel 7 and pinion 18 at one-half the speed of the drive shaft 16. The downward movement of the piston, however, is intermittent due to the contour of the cam 19 which it will be seen transmits no movement to the follower cam during approximately three-quarters of a revolution of the shaft 16, but during the remaining quarter revolution not only rocks the lever 12 through an arc corresponding to the travel of the piston through one-half stroke, but does so after each one-half revolution of the body and when the cylinder is in line with the inlet and discharge passages.

Thus with the parts in the position shown in Figure 1, with the drive shaft 16 turning counter-clockwise and driving the body 4 in a clockwise direction, the piston is at the top of its stroke and about to deliver the charge in the lower end of the cylinder. This takes place as the bell crank follower arm 20ª rides over the cam 19, thus throwing the lower arm 20ᵇ upwardly and thereby rocking the lever 12 to drive the piston down. The bell crank lever is immediately carried back to its normal position by the spring 22ª as the follower passes the cam 19, whereupon the end of the rocking lever 13, left in its elevated position, is carried around with the rotating body to the lower arc of its circular path, where it again comes into contact with the bell crank lever and is immediately lifted or tripped to drive the piston downwardly again. Thus during each complete revolution of the body 4, the piston completes one stroke or two reciprocations in opposite directions, and discharges two charges of the material. As has been noted, however, these reciprocations of the piston are not continuous as in an engine, for instance, but are intermittent, occurring with considerable rapidity during the intervals that the ends of the cylinder in the body are passing the intake and discharge passages.

Assuming, then, that the volume of each charge is known, the speed of the drive shaft 16 can be regulated so that the amount of material passing through the device during a given period of time can be accurately measured.

A measuring device of this construction has the advantage of being readily dismounted for the purpose of cleaning, as the body can be quickly removed and replaced for this purpose. This is particularly desirable in the handling of sticky substances such as chicle which adheres with great tenacity if accumulations are not removed periodically, and particularly upon shutting down the device. In this connection also, it may be desirable to surround the casing of the device with a steam or water jacket for the handling of heavy viscous substances, as well as providing for the circulation of a heating medium through the rotating body and around the cylinder.

Having set forth a preferred embodiment of my invention, I claim:

1. A measuring device comprising a casing having intake and discharge passages for the material to be measured, a rotative body member mounted in said casing and having a cylinder open at both ends and extending diametrically thereof in the plane of said intake and discharge passages, a piston in said cylinder, a gear wheel fixed to said body member, a drive shaft, a pinion mounted on said drive shaft and meshing with said gear wheel, a lever extending axially of said body member and pivotally mounted intermediate its ends at one end thereof, one end of said lever being pivotally connected with said piston, a cam mounted on said drive shaft, and a lever actuated by said cam and adapted to engage the outer end of said first mentioned lever to impart a reciprocating motion to said piston as the opposite ends of said cylinder are brought into register with said intake and discharge passages.

2. A measuring device comprising a casing having intake and discharge passages for the material to be measured, a rotative body member mounted in said casing and having a cylinder open at both ends and extending diametrically thereof in the plane of said intake and discharge passages, a piston in said cylinder, a rocking lever operatively connected with said piston and having an arm projecting from one end of said body member, a drive shaft, a gear wheel mounted on said body member, a pinion on said drive shaft and meshing with said gear wheel, a cam on said drive shaft, a bell crank lever having one arm acting as a follower for said cam and the other adapted to engage the outer end of said rocking lever, whereby said piston is reciprocated during each one-half revolution of said body member and when the ends of said cylinder are in register with said intake and discharge passages.

Signed at Chicago, this 7th day of December, 1928.

WILLET B. RANNEY.